UNITED STATES PATENT OFFICE.

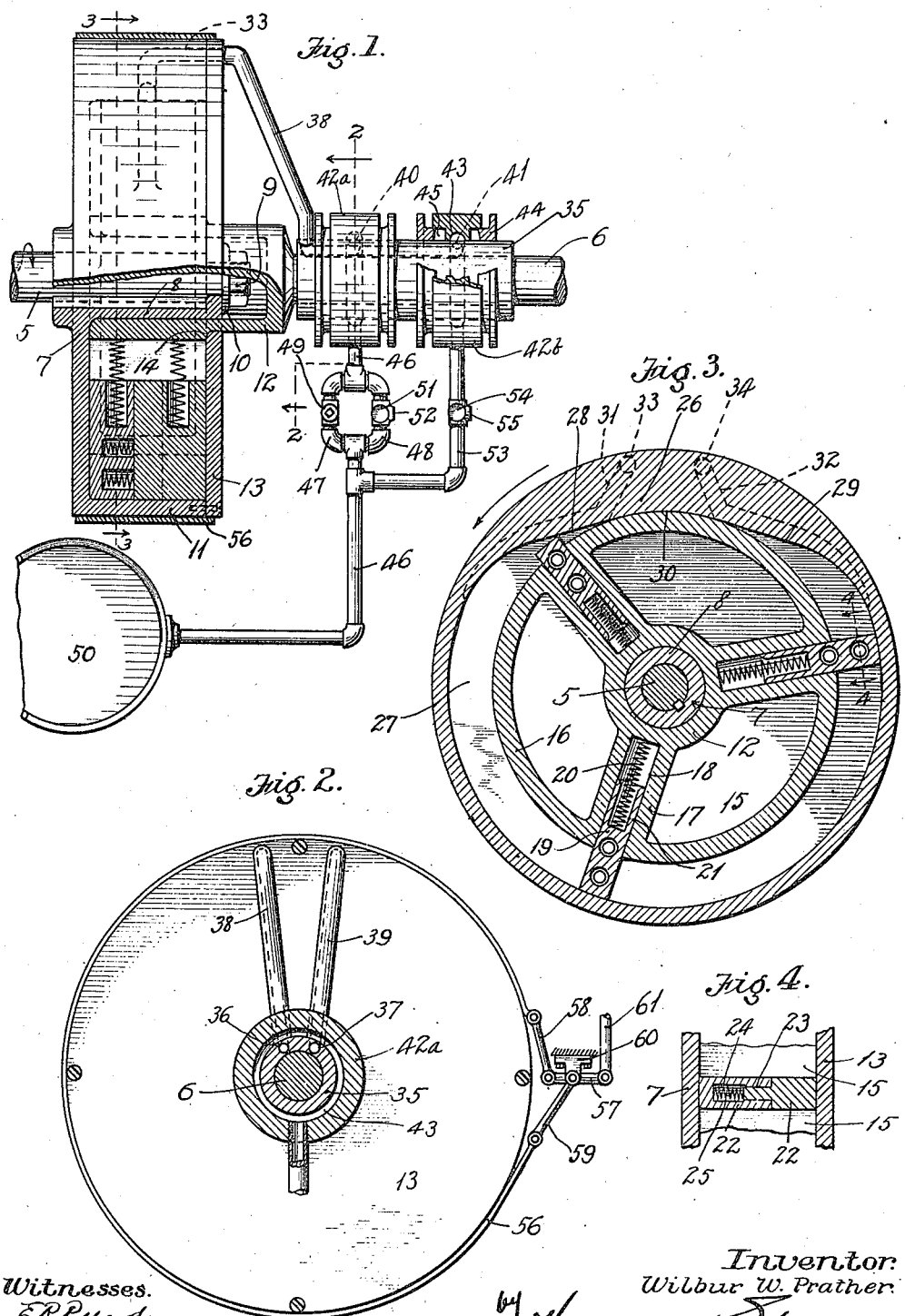

WILBUR W. PRATHER, OF ADAMS SPRINGS, CALIFORNIA.

CLUTCH.

965,325.  Specification of Letters Patent.  Patented July 26, 1910.

Application filed January 3, 1910. Serial No. 536,022.

*To all whom it may concern:*

Be it known that I, WILBUR W. PRATHER, a citizen of the United States, residing at Adams Springs, in the county of Lake and State of California, have invented new and useful Improvements in Clutches, of which the following is a specification.

This invention relates to clutches and is particularly applicable when used as a part of the mechanism of automobiles or similar vehicles.

The object of the invention is to produce a clutch of pneumatic type which can be nicely controlled and which can be operated in a special manner from an air-reservoir to start the engine, and which is so connected with the air-reservoir that it will perform the functions of an air compressor and a brake when desired. In addition to this the clutch may be operated so as to drive the automobile independently of the engine. In this connection it is particularly useful for shifting an automobile about in a garage or for moving it a short distance under similar circumstances.

The invention consists in the construction and combination of parts to be more fully described hereinafter and particularly set forth in the claims.

In the annexed drawing which fully illustrates my invention, Figure 1 is a side elevation and partial section of a clutch constructed according to my invention and showing the connections from the clutch to the air-reservoir. Fig. 2 is a vertical section taken on the line 2—2 of Fig. 1 and further illustrating details of the construction. Fig. 3 is a transverse section taken through the body of the clutch and further illustrating its construction. Fig. 4 is a section taken on the line 4—4 of Fig. 3 and particularly illustrating the manner in which the clutch is packed against leakage at certain points.

Referring more particularly to the parts, 5 represents the engine shaft or driving shaft from which the clutch transmits the power to a driven shaft 6. The clutch comprises a driving member 7 which is formed with a hub 8 rigidly attached to the shaft 5 as shown. In order to secure this hub firmly on the shaft, I provide a hub nut 9 as indicated, which screws on to the end of the shaft seating upon a washer 10 which retains the hub, as will be readily understood. The clutch member 7 is in the form of a wheel and presents a cylindrical rim 11.

Telescoping over the hub 8 there is received a tubular neck 12 which constitutes an extension of the driven shaft 6. The clutch is provided with a head or coverplate 13 which has a central opening receiving the tubular neck 12, the outer edge of said plate being secured to the rim 11, as indicated. That part of the neck 12 which is disposed in the interior of the clutch is of increased thickness as shown, so that a shoulder 14 is formed, against which the inner portion of the plate 13 seats as shown.

The neck 12 within the interior of the clutch is formed integral with a drum 15, said drum having a cylindrical rim 16 which is connected with the neck 12 by radial posts 17, as indicated. It should be understood that the neck 12 constitutes the hub for this drum 15. The posts 17 are cut away on their interior to form radial guides 18 for piston-blades or heads 19, and in the interior of the guide-openings springs 20 are received, the outer ends of which are received in spring sockets 21 formed in the inner edges of the heads or blades 19. In this way the piston-blades are forced outwardly so that their outer edges are constantly held against the inner face of the rim 11 of the driven member of the clutch. In order to pack these piston-guides and take up wear they are preferably formed in two sections 22 having a tongue and groove connection 23 therebetween, as shown in Fig. 4, and one of the sections 22 is formed with spring pockets 24 receiving springs 25 which tend to spread the sections 22 apart. In this way the side edges of the piston-blades are held tightly against the heads of the clutch.

Referring especially to Fig. 3, it will be seen that the rim 11 throughout nearly its entire circumference is of uniform thickness and is struck on a constant radius, that is, all points on the inner face of the rim throughout nearly the entire circumference are at the same distance from the central axis of the shaft. At one side of the clutch member 7 the rim 11 is of increased thickness so as to form an abutment 26 projecting into an air chamber 27 which is formed within the clutch. This abutment presents inclined faces 28 and 29 which merge gradually from the normal radius of the rim 11 to the radius of the inner face 30 of the abutment. In this way the abutment 26 presents a short concave face which fits nicely on the curved outer face of the drum 15. In the abutment 26, passages 31 and 32 are formed which lead inwardly from ports 33 and 34 which pass through the head or cover-plate 13 as shown in Fig. 1. The passages 31 and 32 extend in opposite directions in the abutment so that they open communication with the chamber 27 on each side of the abutment 26.

On the driven shaft 6 I provide a sleeve 35 and this sleeve is provided with two longitudinally extending ducts 36 and 37 as indicated in Fig. 2. The duct 36 is connected by a pipe connection 38 with the port 33, and the duct 37 is connected by a pipe connection 39 with the port 34. The duct 36 emerges on the surface of the sleeve 35 at a port 40, and the duct 37 emerges at a similar port 41. Over these ports 40 and 41 two stuffing box rings 42ª and 42ᵇ are received, said rings having annular grooves 43 on their inner faces which seat over the ports respectively, as shown. The ends of these rings 42ª and 42ᵇ are counter-bored so as to receive stuffing box glands 44 as indicated very clearly in Fig. 1. These stuffing box glands are adapted to be adjusted into a packing space 45 so as to pack the rings 42ª and 42ᵇ against leakage as will be readily understood. The annular groove 40 of the ring 42ª is in communication with an air-pipe 46, and this air-pipe 46 is provided with branch-pipes 47 and 48 as shown. The pipe 47 is provided with a check valve 49 which opens in a direction which will permit air to pass from the sleeve back toward an air reservoir 50 to which the end of the pipe 46 is attached. The other branch-pipe 48 is provided with a three-way cock 51 which has a mouth 52 which may be opened to the atmosphere. A second air-pipe 53 is provided which connects with the annular groove 43 of the sleeve 42ᵇ, and this pipe 53 connects with the pipe 46 beyond the branch-pipes 47 and 48. In the pipe 53 is provided a three-way cock 54 which has a mouth 55 open to the atmosphere, as will be readily understood.

On the outer face of the rim 11 a brake band 56 is placed which is adapted to be drawn tight upon the clutch by means of a lever 57 having a link 58 connected to one end of the band, the other end of the band being connected by an anchor-link 59 with a bracket 60 upon which the lever 57 is mounted. The lever 57 may be operated by a draw-rod 61, as will be readily understood.

The mode of operation of the clutch will now be described.

When the vehicle is running at uniform speed and running on the clutch, that is, without any slip taking place between the driven member and the driving member of the clutch, the three-way cock 54 will be open to the atmosphere and the three-way cock 51 will be closed, the direction of rotation of the engine being indicated by the arrows in Figs. 1 and 3. This will tend to produce a compression between the abutment 26 and the adjacent blade 19 just in advance of the abutment with respect to the direction of rotation, and through the compression of the air in the chamber 27 operating on this adjacent blade, the tubular neck 12 will be rotated and the rotation transmitted to the shaft 6.

In using the clutch as a starting device for a gas engine, the three-way cock 54 should be open to the air reservoir, and the three-way cock 51 should be open to the atmosphere from the sleeve. Under these circumstances, air under pressure from the reservoir 50 will flow through the pipe 53 to the duct 37 and the port 34 to the passage 29. At the right of the abutment 26 as viewed in Fig. 3, the compressed air coming into the chamber 27 on this side of the abutment will tend to rotate the driving member of the clutch in the direction indicated by the arrows, that is, in the forward direction for the engine shaft 5. In this connection it should be understood that the drum 15 will be substantially stationary, as it is connected with the driven shaft 6 which extends rearwardly to the driving wheels of the motor car. By applying the brakes of the motor car this shaft 6 can be held rigid until the engine commences to drive itself under the action of the explosive charges. The fact that the three-way cock 51 is open to the atmosphere permits the free exhaust of the air from the clutch chamber after it has done its work in expanding. In this way the clutch is made to operate temporarily as a rotary device.

In order to shift the car or automobile by means of the clutch, the brake-band is tightened on the clutch and the three-way cock 51 is opened to the reservoir, while the three-way cock 54 opens duct 37 to the atmosphere. This will admit compressed air from the reservoir 50 through the port 33 to the air chamber 27 at the left side, as viewed in Fig. 3. This will rotate the drum 15 and the driven shaft 6 in a forward direction so as to advance the vehicle. If it is desired to shift the vehicle in the other direction, the condition of the three-way cocks 51 and 54 is reversed, while the brake band is held applied. The application of the brake band as described holds the normal driving member of the clutch fixed so that the compressed air reacts against the abutment in rotating the drum.

When it is desired to compress air in the clutch and force the same into the air reservoir 50, this is accomplished by opening three-way cock 54 to the atmosphere so as to admit free air to duct 37, and closing three-way cock 51. In this condition of the three-way cocks, the compressed air can only pass in the pipe 46 by way of the check valve 49. The gasolene engine driving-shaft 5 is then driven in a forward direction and as it rotates, the air in the chamber 27 is compressed by the piston blades, passing out of the chamber 27 through the passage 31 and port 33, and thence through the sleeve 42ª and the check valve 49 to the reservoir.

It should be understood that the clutch can be made to operate as a brake by throwing it into operation as suggested, as a compressor, but, if it is not desired to use the air compressed in the clutch when used as a brake for the engine, the three-way cock 51 may be partially opened to the atmosphere, so as to give a restricted outlet for the compressed air. Of course if, under these circumstances, the pressure of the air compressed in the chamber 27 should rise dangerously high, it would pass through the check valve 29 into the reservoir.

Special attention is called to the construction of the driving clutch member and particularly to the feature of giving the rim 11 thereof a uniform radius throughout the principal portion of its circumference. By adopting this arrangement it will be seen that when the piston-blades 19 are sliding in or out they are not subjected to the air pressure. This I regard as a valuable feature because the piston-blades are not then subjected to the high frictional resistance which would otherwise occur and which would resist their sliding in and out in passing the abutment 26. This effect of course is produced by extending the passages 31 and 32 beyond the abutment so that they open out on the inner side of the rim 11 at a point where the rim has its uniform radius.

Attention is called to the fact that with the construction of the clutch illustrated, there are no parts mounted on the engine shaft 5 and this enables my invention to be applied to automobile engines without requiring changes in the design of the engine or fly wheel to adapt them for using my clutch.

The fact that the clutch can be used as a starting device is a great advantage, for it obviates the necessity for "cranking up" a gasolene engine.

Having described my invention what I claim as new and desire to secure by Letters Patent is:

1. In a device of the class described, in combination, a driving shaft, a driven shaft in alinement therewith, one of said shafts having a clutch member inclosing an air chamber, the other of said shafts having a drum attached thereto within said chamber and constituting a second clutch member, said first clutch member having an abutment coöperating with said drum, blades carried by said drum and projecting into said air chamber, a reservoir, ports adapted to admit air to said air chamber on either side of said abutment, said ports being constantly opened, and means removed from said clutch members for controlling the flow of fluid from said reservoir to said ports.

2. In combination, a driven shaft, a drum carried thereby, a driving shaft in alinement with said driven shaft, a wheel attached thereto and having an air chamber receiving said drum, said wheel having an abutment engaging the face of said drum, piston blades guided radially in said drum and obstructing said air chamber, said wheel having ports therein adapted to admit air on either side of said abutment into said air chamber, a sleeve loosely mounted on said driven shaft and having a pair of ducts extending longitudinally therein, means for connecting said ducts respectively with said ports, said ducts having port openings on the outer face of said sleeve, stuffing box rings enveloping said sleeve at said port openings, an air reservoir, a pipe connecting said air reservoir with one of said rings, said pipe having a pair of branch pipes therein, one of said branch pipes having a check-valve, the other of said branch pipes having a cock mounted therein adapted to open communication from said air chamber to the atmosphere, a second pipe attached to the other of said rings and attached to said first pipe beyond said branch pipes and adjacent said reservoir, and a cock mounted in said second pipe adapted to open communication from said air chamber through one of said ducts to the atmosphere.

3. In combination, a driving shaft, a driven shaft in alinement therewith, a case carried by said driving shaft, a member carried by said driven shaft within said case, ports formed in said case and adapted to admit a fluid, the admission through one of said ports affording means for producing a relative rotation of said case and said member in one direction, the admission through the other of said ports producing a relative rotation in the opposite direction, a sleeve rotatably mounted on said driven shaft and having ducts extending longitudinally therein, tubes connecting said ducts respectively with said ports, stuffing box rings loosely mounted on said sleeve and communicating respectively with said ducts, and pipes connecting respectively with said rings and adapted to admit a fluid thereto.

4. In combination, a driving shaft, a driven shaft in alinement therewith, a case carried by said driving shaft, a member carried by said driven shaft within said case, ports formed in said case and adapted to admit a fluid, the admission through one of said ports affording means for producing a relative rotation of said case and said member in one direction, the admission through the other of said ports producing a relative rotation in the opposite direction, a sleeve rotatably mounted on said driven shaft and having ducts extending longitudinally therein, tubes connecting said ducts respectively with said ports, stuffing box rings loosely mounted on said sleeve and communicating respectively with said ducts, a pipe in communication with one of said rings and adapted to admit a fluid under pressure thereto, a second pipe in communication with the other of said rings and adapted to admit a fluid under pressure, and means in said pipes for closing off the flow of the fluid under pressure and opening communication from either of said ducts to the atmosphere.

5. In combination, a driving shaft, a driven shaft in alinement therewith, a drum carried by said driven shaft, a case carried by said driving shaft, said case forming an air chamber around said drum, the wall of said case having an abutment touching the face of said drum, blades radially guided in said drum and obstructing said air chamber, said case having ports therein adapted to admit air under pressure to said air chamber on either side of said abutment, a sleeve rotatably mounted on said driven shaft, said sleeve having a pair of ducts formed therein, means for connecting said ducts respectively with said ports, an air reservoir, rings mounted on said sleeve communicating respectively with said ducts, pipe connections between said air reservoir and said rings, a check valve in said pipe connections permitting air to pass from said sleeve toward said air reservoir, and means in said pipe connections for opening communication from said air reservoir to either of said ducts and adapted to open communication between either of said ducts and the atmosphere.

6. A clutch having a case with a circumferentially disposed rim, the inner face of said rim throughout the greater portion of the circumference thereof being disposed at the same distance from the axis of said case, said rim being formed with an abutment projecting inwardly, a drum rotatably mounted within said case having a face touching said abutment, said drum being of reduced diameter with respect to said case, whereby an air chamber is formed thereabout, blades guided substantially radially in said drum, resilient means behind said blades holding the outer edges thereof against the inner face of said rim, said case having ports therein communicating with said air chamber beyond said abutment whereby said blades are only under side pressure from the air when out of contact with said abutment, and means for admitting air to either of said ports, fixed at a point removed from said case.

7. A clutch of the class described having a case, a drum rotatably mounted in said case, blades mounted in said drum, means for pressing said blades radially outwardly, said case having a rim pressed by the outer edges of said blades, said blades being divided in a radial direction with respect to the axis of said drum whereby they are formed in sections disposed side by side, and means disposed between said sections tending to spread the same laterally apart, said case having heads against which the side edges of said blades touch.

8. In combination, a driving shaft, a driven shaft in alinement therewith, a case carried by said driving shaft and having a braking face on the outer side thereof, a brake on said braking face adapted to hold said case against rotation, a member carried by said driven shaft within said case, ports formed in said case and adapted to admit a fluid, the admission through said ports affording means for producing a relative rotation of said case and said member, a fluid reservoir, and means for connecting said fluid reservoir with said ports and adapted to open either of said ports to the atmosphere.

In witness that I claim the foregoing I have hereunto subscribed my name this 27th day of December, 1909.

WILBUR W. PRATHER.

Witnesses:
F. D. AMMEN,
EDMUND A. STRAUSE.